(12) United States Patent
Sakurai et al.

(10) Patent No.: US 10,792,683 B2
(45) Date of Patent: Oct. 6, 2020

(54) PAINT SPRAYING APPARATUS FOR STABILIZER, COATING INSTALLATION, AND COATING METHOD

(71) Applicant: NHK SPRING CO., LTD., Yokohama-shi, Kanagawa (JP)

(72) Inventors: Yasuharu Sakurai, Yokohama (JP); Yoshihiro Koshita, Yokohama (JP); Akifumi Otani, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 218 days.

(21) Appl. No.: 15/954,871

(22) Filed: Apr. 17, 2018

(65) Prior Publication Data

US 2018/0229250 A1 Aug. 16, 2018

Related U.S. Application Data (63) Continuation of application No. PCT/JP2016/080140, filed on Oct. 11, 2016.

(30) Foreign Application Priority Data

Oct. 23, 2015 (JP) .................. 2015-209163

(51) Int. Cl.
*B05B 5/08* (2006.01)
*B05D 1/06* (2006.01)
(Continued)

(52) U.S. Cl.
CPC .............. *B05B 5/087* (2013.01); *B05B 5/025* (2013.01); *B05B 5/082* (2013.01); *B05B 7/1454* (2013.01);
(Continued)

(58) Field of Classification Search
None
See application file for complete search history.

(56) References Cited

U.S. PATENT DOCUMENTS 7,896,983 B2   3/2011   Koyama et al.
2002/0170177 A1   11/2002   Koyama et al.
(Continued)

FOREIGN PATENT DOCUMENTS

CN   102189910 A   9/2011
DE   102011055980 A1   6/2013
(Continued)

OTHER PUBLICATIONS

Cedarberg, "Snap-Loc Systems" (Year: 2013).*
(Continued)

*Primary Examiner* — Shamim Ahmed
*Assistant Examiner* — Bradford M Gates
(74) *Attorney, Agent, or Firm* — Holtz, Hotlz & Volek PC (57) ABSTRACT

A paint spraying apparatus includes a supporting structure, a lower nozzle unit, and an upper nozzle unit. The lower nozzle unit includes lower flexible tubes and nozzles, and ejects powder paint toward an eye portion on a lower side of a stabilizer. The upper nozzle unit includes a first frame and a second frame. First flexible tubes are arranged on the first frame. Second flexible tubes are arranged on the second frame. The upper nozzles eject the powder paint toward an eye portion on an upper side of the stabilizer.

6 Claims, 8 Drawing Sheets

(51) Int. Cl.
*B60G 21/055* (2006.01)
*B05B 13/02* (2006.01)
*B05B 12/18* (2018.01)
*B05B 7/14* (2006.01)
*B05B 5/025* (2006.01)
*B05D 3/02* (2006.01)
*B05D 3/04* (2006.01)
*B05D 7/14* (2006.01)
*B05B 5/043* (2006.01)
*B05B 15/654* (2018.01)

(52) U.S. Cl.
CPC .......... *B05B 12/18* (2018.02); *B05B 13/0264* (2013.01); *B05B 13/0278* (2013.01); *B05D 1/06* (2013.01); *B05D 3/0272* (2013.01); *B05D 3/0406* (2013.01); *B60G 21/055* (2013.01); *B05B 5/043* (2013.01); *B05B 15/654* (2018.02); *B05D 7/14* (2013.01); *B05D 2202/10* (2013.01); *B60G 2202/135* (2013.01); *B60G 2206/427* (2013.01); *B60G 2206/80* (2013.01); *B60G 2206/8112* (2013.01)

(56) References Cited

U.S. PATENT DOCUMENTS

2005/0001061 A1* 1/2005 Mauchle ................ B05B 5/032
239/423

2011/0250364 A1* 10/2011 Yamaguchi ............ B05B 7/144
427/475

2013/0108785 A1   5/2013 Okamoto et al.

FOREIGN PATENT DOCUMENTS

| FR | 2028690 A1 | 10/1970 |
| JP | 07237428 A | 9/1995 |
| JP | 2002331326 A | 11/2002 |
| JP | 2010167401 A | 8/2010 |
| WO | 9422589 A1 | 10/1994 |
| WO | 2011158543 A1 | 12/2011 |
| WO | 2013099513 A1 | 7/2013 |
| WO | 2014013827 A1 | 1/2014 |
| WO | 2016093199 A1 | 6/2016 |

OTHER PUBLICATIONS

International Search Report (ISR) dated Dec. 13, 2016 issued in International Application No. PCT/JP2016/080140.

Written Opinion dated Dec. 13, 2016 issued in International Application No. PCT/JP2016/080140.

Extended European Search Report (EESR) dated Apr. 16, 2019 issued in counterpart European Application No. 16857333.5.

* cited by examiner

PAINT SPRAYING APPARATUS FOR STABILIZER, COATING INSTALLATION, AND COATING METHOD

CROSS-REFERENCE TO RELATED APPLICATIONS

This application is a Continuation Application of PCT Application No. PCT/JP2016/080140, filed Oct. 11, 2016 and based upon and claiming the benefit of priority from prior Japanese Patent Application No. 2015-209163, filed Oct. 23, 2015, the entire contents of all of which are incorporated herein by reference.

BACKGROUND OF THE INVENTION

1. Field of the Invention

The present invention relates to a paint spraying apparatus, a coating installation, and a coating method for use in coating a vehicle stabilizer.

2. Description of the Related Art

A stabilizer arranged in a suspension mechanism part of a vehicle, which is formed of a steel pipe or a solid rod-shaped steel material, includes a torsion portion (a twisted portion) which extends in a width direction of the vehicle, and a pair of arm portions (arms) connected via bent portions on both ends of the torsion portion. On a distal end of each of the arm portions, an eye portion is formed. In an example of the suspension mechanism part, the torsion portion of the stabilizer is supported by a vehicle body via a rubber bushing, etc. The eye portion is connected to a suspension arm, etc., via a connecting member such as a stabilizer link. With respect to the stabilizer fitted in the suspension mechanism part, as the arm portion, the bent portion, and the torsion portion function as a spring in reaction to a rolling behavior of the vehicle body, roll stiffness of the vehicle can be enhanced.

For example, in a hollow stabilizer described in Patent Literature 1 (JP H07-237428 A), by flattening both ends of a steel pipe, a pair of eye portions are formed. On the eye portions, flat-shaped fastening surfaces are formed, respectively, and through-holes are formed in the respective fastening surfaces. In each of the through-holes, a connecting member such as a bolt or a stabilizer link is inserted. The eye portion is connected to a suspension mechanism member such as the suspension arm through the connecting member.

Patent Literature 2 (JP 2002-331326 A) describes an example of a method of manufacturing a stabilizer. In this manufacturing method, a coating film is formed on a surface of the stabilizer formed of a steel pipe by a coating process. In one example of the coating process, electrostatic dry spray coating or fluidized bed coating using powder paint is adopted. By the coating process, a coating film is formed on a surface of the steel pipe at a substantially uniform thickness.

With respect to the coating of the stabilizer, it is required to make the coating film thick in a stabilizer body portion other than the eye portion, and reduce the thickness of the coating film of the eye portion as compared to the stabilizer body portion. In such a case, in a conventional coating method, a paint is sprayed thickly on the entire stabilizer in a state in which the eye portion is subjected to masking, for example. After that, the masking is removed, and the eye portion is coated thinly by touch-up paint. Alternatively, the eye portion may be coated by immersing the eye portion in a dipping tank. In addition, in performing the coating with a coating gun, thinning the coating film of the eye portion by increasing the movement speed of the coating gun at the eye portion as compared to the stabilizer body portion has also been conceived.

If the eye portion is to be masked as in the above-mentioned conventional example, it takes time and trouble to provide a masking member on the eye portion before coating, and remove the masking member after the coating. For this reason, a coating method which uses the masking member is not suitable for mass production. In another conventional example, the movement speed of the coating gun is increased at the eye portion, and is decreased in the stabilizer body portion. However, in that case, since the paint is sprayed on the eye portion in a short time, it is difficult to make the paint adhere to the eye portion evenly, and the thickness of the paint may be varied greatly.

BRIEF SUMMARY OF THE INVENTION

Accordingly, an object of the present invention is to provide a paint spraying apparatus, a coating installation, and a coating method for a stabilizer, which is cable of forming coating films of different thicknesses in the eye portion of the stabilizer and the stabilizer body portion, and reducing variations in the thickness of the coating film of the eye portion.

A paint spraying apparatus used in a coating installation according to one embodiment includes a supporting structure, a lower nozzle unit provided on the supporting structure and configured to spray powder paint toward a lower eye portion of a stabilizer, and an upper nozzle unit provided on the supporting structure and configured to spray the powder paint toward an upper eye portion of the stabilizer. The lower nozzle unit includes a lower frame, a plurality of lower flexible tubes arranged on the lower frame, lower nozzles provided at respective distal ends of the lower flexible tubes, and configured to eject the powder paint, and lower electrodes which provide a charge to the powder paint ejected from the lower nozzles. The upper nozzle unit comprises a first frame extending in a first direction, a plurality of first flexible tubes arranged on the first frame, first nozzles provided at respective distal ends of the first flexible tubes, and configured to elect the powder paint, a second frame extending in a second direction different from the direction of the first frame, second flexible tubes arranged on the second frame, second nozzles provided at distal ends of the second flexible tubes, and configured to eject the powder paint, upper electrodes which provide a charge to the powder paint ejected from the first nozzles and the second nozzles, and a paint feed mechanism which supplies the powder paint to the lower flexible tubes, the first flexible tubes, and the second flexible tubes.

According to the present embodiment, it is possible to form coating films of different thicknesses in the eye portion of the stabilizer and the stabilizer body portion, and reduce variations in the thicknesses of the coating films in one eye portion and the other eye portion.

A coating installation according to one embodiment includes a hanger including a hook which is inserted into a through-hole of one of eye portions provided on both ends of a stabilizer, an electrostatic gun which sprays charged powder paint on the entire stabilizer suspended by the hanger, thereby making the powder paint adhere to the entire stabilizer at a first thickness, an air injection gun which exfoliates the powder paint adhering to the respective eye portions of the stabilizer by an air blow, the paint spraying apparatus which sprays the powder paint on the respective eye portions, thereby making the powder paint adhere to the eye portions at a second thickness less than the first thickness, and a heating furnace which bakes the powder paint adhering to the stabilizer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A coating installation and a coating method for a stabilizer according to one embodiment will be hereinafter described with reference to FIGS. 1 to 8.

Figure 1:
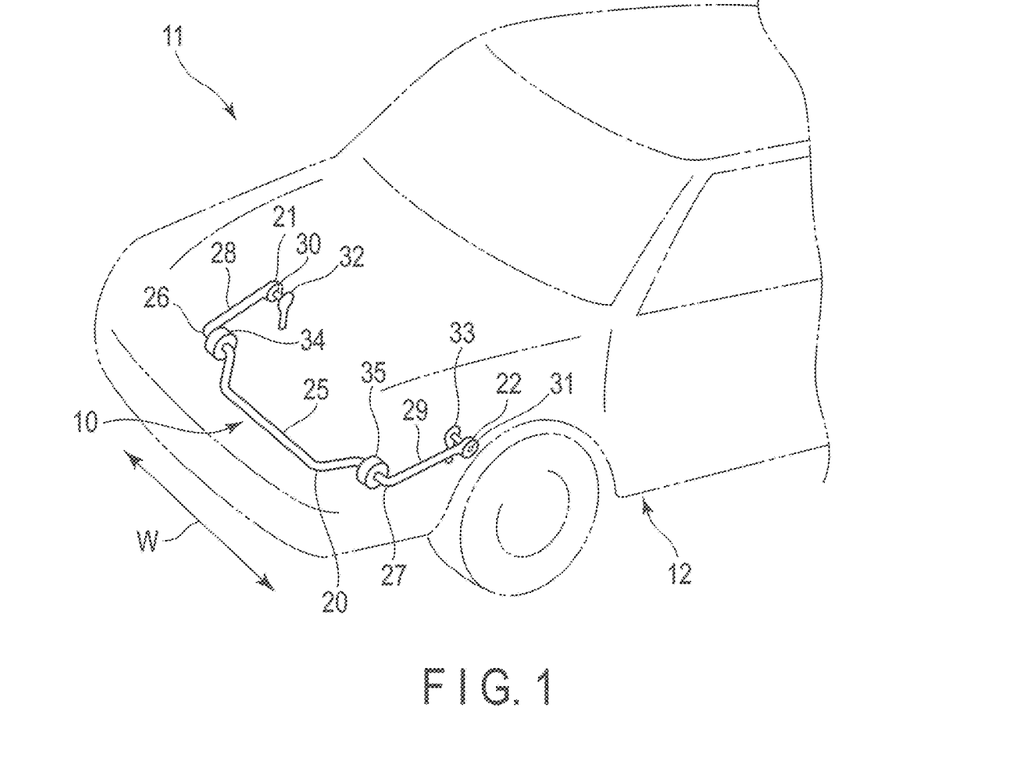
FIG. 1 is a perspective view showing a part of a vehicle and a stabilizer.

FIG. 1 shows a part of a vehicle 11 comprising a vehicle stabilizer 10 (which may be simply referred to as a stabilizer in the present specification). The stabilizer 10 is arranged in a suspension mechanism part provided at the lower part of a vehicle body 12.

The stabilizer 10 includes a stabilizer body portion 20 formed of a rod-shaped steel material, and a pair of eye portions 21 and 22 formed on both ends of the stabilizer body portion 20. The stabilizer body portion 20 includes a torsion portion 25, bent portions 26 and 27, and arm portions 28 and 29. The torsion portion 25 extends in a width direction (i.e., a direction indicated by arrow W in FIG. 1) of the vehicle body 12. The arm portions 28 and 29 are continuous with both ends of the torsion portion 25 through their corresponding bent portions 26 and 27. The stabilizer 10 is substantially bilaterally symmetric when viewed from the front side of the vehicle 11. Accordingly, the eye portions 21 and 22 are also bilaterally symmetric.

The shape of the stabilizer 10 is not limited to planar. For example, the stabilizer 10 may include one or more bending portions in the torsion portion 25, or one or more bending portions in the arm portions 28 and 29, including a three-dimensional bent configuration. Also, the bent portions 26 and 27 may be configured to have a three-dimensional bent configuration, for example, and can be formed into various bent shapes.

The stabilizer 10 of the present embodiment is a hollow stabilizer. The material of the stabilizer 10 is a hollow steel material (a steel pipe), and is formed into a predetermined shape by a bending machine. An example of the steel material is a type of steel capable of improving its strength by a heat treatment such as quenching, more specifically, using ASB25N or the like as the material. By flattening both ends of the steel material (distal ends of the arm portions 28 and 29) by plastic working (a press), the eye portions 21 and 22 are formed. Note that in a case of a solid stabilizer as another embodiment, a solid steel rod is used as the material.

Circular through-holes 30 and 31 are formed in the eye portions 21 and 22. The through-holes 30 and 31 penetrate the eye portions 21 and 22 in a thickness direction. In the through-holes 30 and 31, connecting members 32 and 33 (FIG. 1) such as bolts or stabilizer links are inserted. The connecting members 32 and 33 are fixed to the eye portions 21 and 22 by fixing members such as a nut.

The arm portions 28 and 29 are connected to suspension arms of the suspension mechanism part, for example, via the connecting members 32 and 33, respectively. The torsion portion 25 is supported by a part of the vehicle body 12 (such as a cross-member), for example, via a pair of support portions 34 and 35 (FIG. 1) comprising a rubber bushing, etc. When forces having opposite phases are input to the arm portions 28 and 29, such as when the vehicle 11 drives on a curve, a bending force is exerted on the arm portions 28 and 29. Bending and torsional force is exerted on the bent portions 26 and 27. The torsion portion 25 is also twisted and a repulsive load is produced. As a result, a rolling behavior of the vehicle body 12 is suppressed.

Coating is applied on a surface of the stabilizer 10 mainly for rust prevention and also in consideration of appearance quality. For example, in a coating process of the stabilizer 10, powder electrostatic coating (an electrostatic dry spray method) and baking are performed. The thickness of a coating film of the eye portions 21 and 22 is, for example 10 to 20 μm. In contrast, the thickness of a coating film of the stabilizer body portion 20 excluding the eye portions 21 and 22 is, for example, 40 to 120 μm. In other words, the thickness of the coating film of the eye portions 21 and 22 is less than the thickness of the coating film of the stabilizer body portion 20.

Figure 2A:
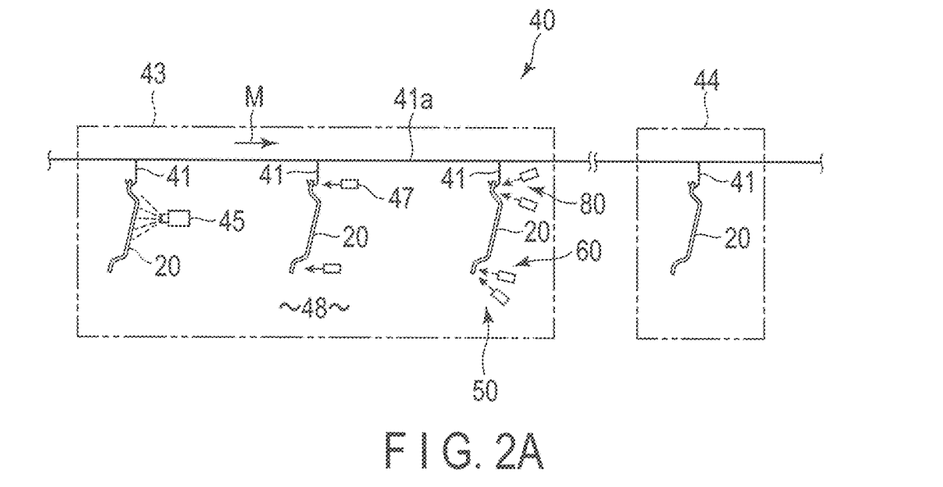
FIG. 2A is an illustration schematically showing a coating installation according to one embodiment.
Figure 2B:
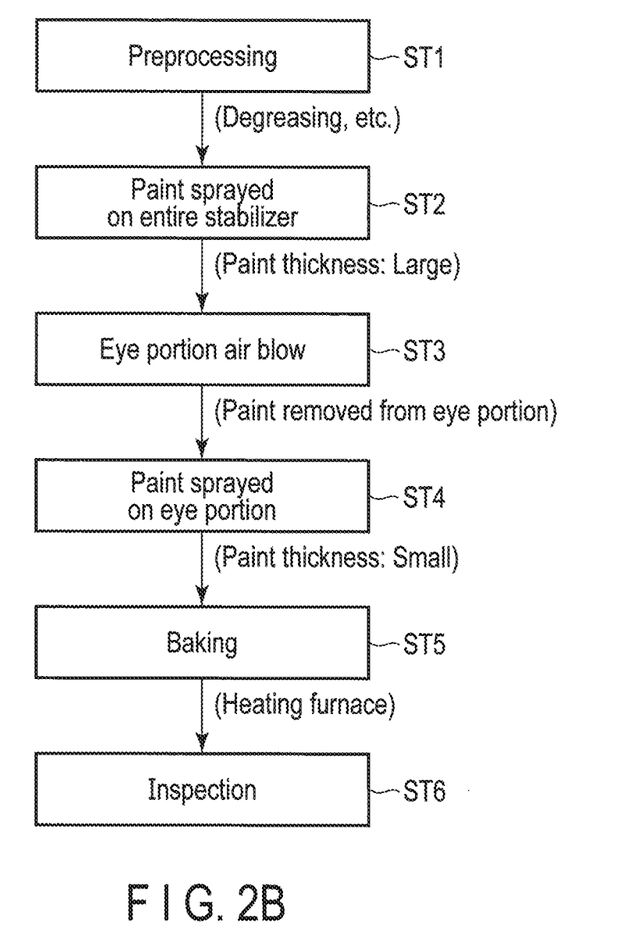
FIG. 2B is a flowchart showing a coating method which uses the coating installation shown in FIG. 2A in the order of steps.
Figure 3:
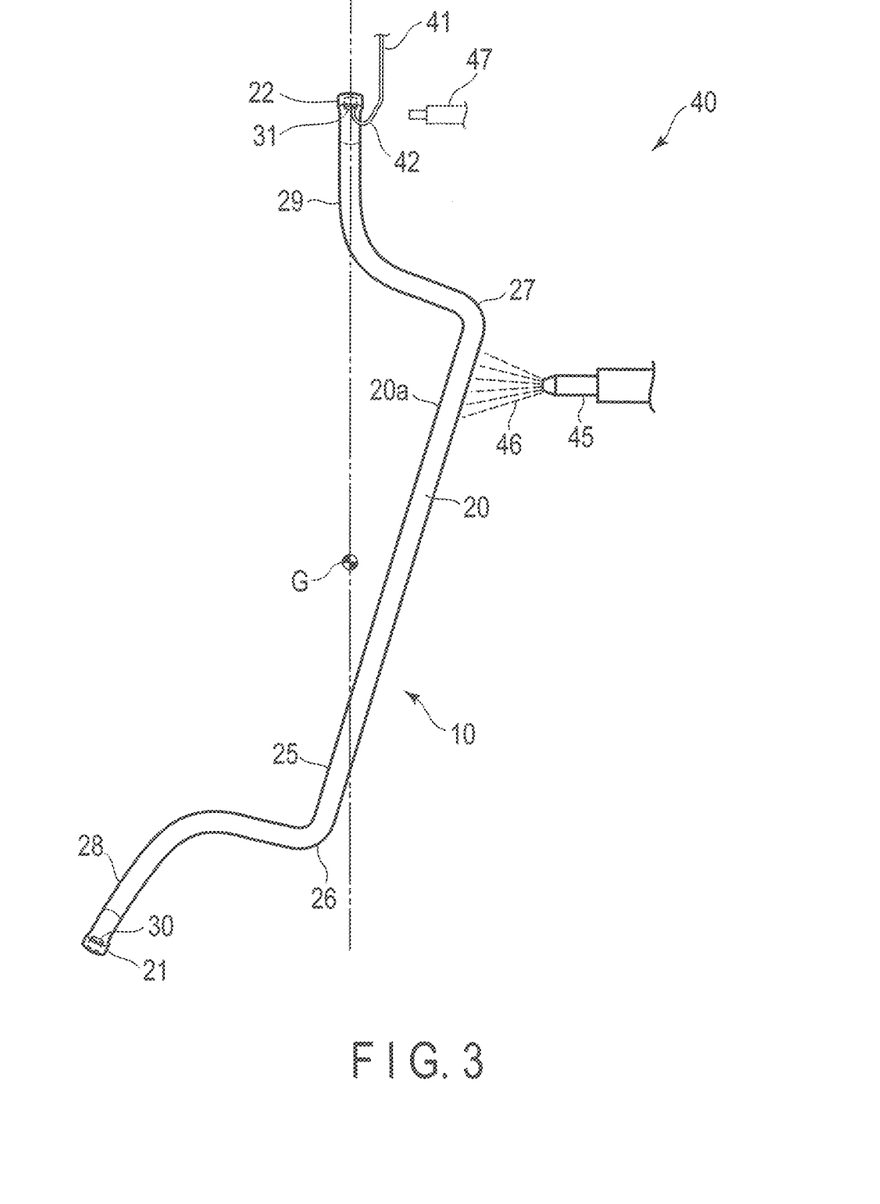
FIG. 3 is a front view showing an electrostatic gun for spraying powder paint on the entire stabilizer which is supported by a hanger.

FIG. 2A schematically shows a coating installation 40 according to one embodiment. FIG. 2B is a flowchart indicating an example of a coating method in the order of steps. FIG. 3 shows a part of the coating installation 40. The coating installation 40 comprises a hanger 41. The stabilizer 10 is continuously carried in a state in which it is suspended by the hanger 41. The hanger 41 is made of metal. A plurality of hangers 41 are provided on a movable body 41a for carrying such as a conveyor chain at a predetermined pitch. Accordingly, the plurality of stabilizers 10 can be moved simultaneously.

On the lower part of each of the hangers 41, a hook 42 is provided. The center of gravity G (FIG. 3) of the stabilizer 10 is at a position displaced laterally to the torsion portion 25. Accordingly, when the stabilizer 10 is suspended by inserting the hook 42 into the through-hole 31 of the eye portion 22, on one side, the stabilizer 10 is supported by the hanger 41 in a position inclined obliquely. In other words, the stabilizer 10 is brought to such a state that one of the eye portions, i.e., the eye portion 22, is supported by the hook 42, and the other eye portion, i.e., the eye portion 21, dangles. Further, the stabilizer 10 is continuously moved in a movement path of the coating installation 40 from a main booth 43 (FIG. 2A) toward a heating furnace 44. Arrow M in FIG. 2A shows the direction of movement of the stabilizer 10.

An example of the coating process will be explained below with reference to FIG. 2B. In a preprocessing step ST1 in FIG. 2B, dirt, oil content, etc., on a surface of the stabilizer 10 are removed. As a result, the surface of the stabilizer 10 (the surface of a steel material 20a) is cleaned, and is brought to a state suitable for coating.

In an overall spraying step ST2 in FIG. 2B, the stabilizer 10 is carried within the main booth 43. The main booth 43 constitutes a part of the coating installation 40. In the main booth 43, by powder electrostatic coating which uses a coating robot and an electrostatic gun 45 (FIG. 2A and FIG. 3), for example, powder paint is sprayed on the entire surface of the stabilizer 10.

The main ingredients of powder paint 46 are, for example, paint particles (solid) formed of polymeric resin and a pigment (for example, a black pigment). In the overall spraying step ST2, the powder paint 46 ejected from the electrostatic gun 45 is sprayed on the entire stabilizer 10. The powder paint 46 ejected from the electrostatic gun 45 is electrically charged by one of electrodes of a high-voltage direct current power supply. The stabilizer 10, which is an object to be coated, is formed of the steel material 20a. The steel material 20a is grounded to the other electrode of the direct current power supply. The powder paint 46, which is ejected together with air from the electrostatic gun 45 toward the stabilizer 10, adheres to the entire surface of the stabilizer 10 (the stabilizer body portion 20 and the eye portions 21 and 22) by electrostatic force at a first thickness.

The stabilizer 10 to which the powder paint 46 has adhered is introduced in an air blow chamber 48 in an air blow step ST3 in FIG. 2B. The air blow chamber 48 constitutes a part of the coating installation 40. Inside the air blow chamber 48, air is sprayed on the eye portions 21 and 22 by an air injection gun 47 (FIG. 3). By this air blow process, the powder paint which had been adhered to the eye portions 21 and 22 is blown away and exfoliates from the eye portions 21 and 22.

Figure 4:
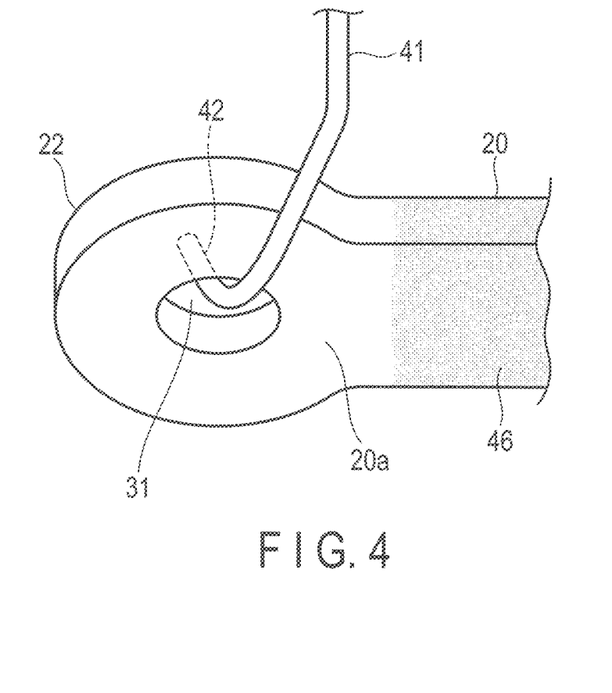
FIG. 4 is a perspective view showing an eye portion of the stabilizer and a part of the hanger shown in FIG. 3 in an enlarged scale.

On the surface of the stabilizer 10 which has underwent the air blow step ST3, the powder paint 46 adheres only to the stabilizer body portion 20 at the first thickness as shown in FIG. 4. Since the powder paint is removed from the eye portion 22, the surface of the steel material 20a is exposed. Although FIG. 4 indicates only the eye portion 22, which is one of the eye portions, the surface of the steel material 20a is also similarly exposed in the other eye portion 21.

Figure 5:
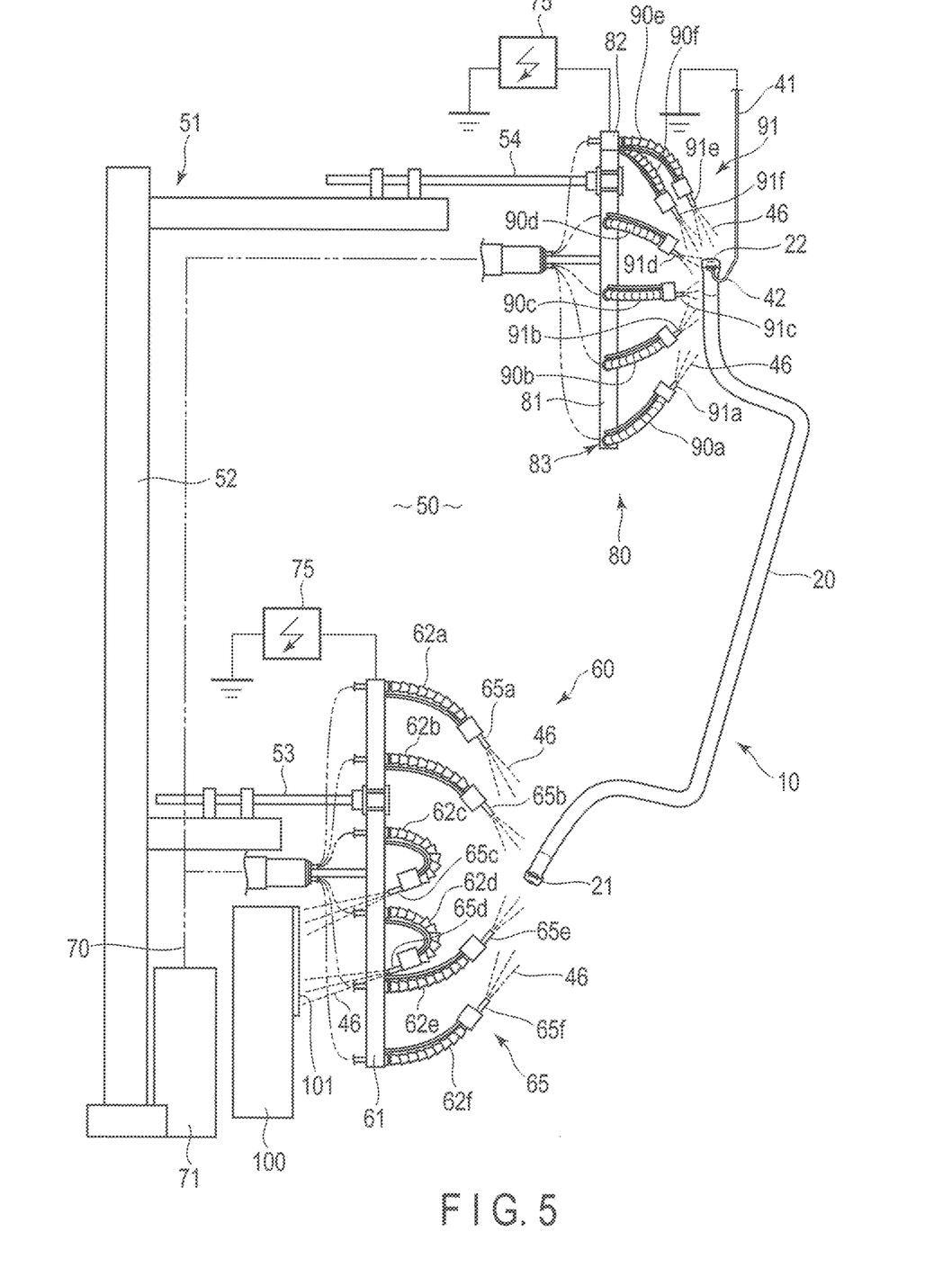
FIG. 5 is a side view showing an example of a state of use of a paint spraying apparatus according to one embodiment.

In an eye paint spraying step ST4 in FIG. 2B, by a paint spraying apparatus 50 shown in FIG. 5, the powder paint 46 is sprayed toward the eye portions 21 and 22. The powder paint 46 adheres to the eye portions 21 and 22 at a second thickness. The thickness (second thickness) of the powder paint 46 adhering to the eye portions 21 and 22 is less than the thickness (first thickness) of the powder paint adhering to the stabilizer body portion 20. The paint spraying apparatus 50 will be described in detail later.

In a baking step ST5 in FIG. 2B, the stabilizer 10 to which the powder paint 46 adheres is accommodated in the heating furnace 44 (FIG. 2A), and the paint is baked at a high temperature. By undergoing this baking step ST5, curing reaction occurs in the paint, and a hard coating film which has been smoothed is fixed on the surface of the stabilizer 10. Quality of the coated stabilizer 10 is inspected in an inspection step ST6, and an accepted product is completed as a finished product.

Next, with reference to FIGS. 5 to 8, an embodiment of the paint spraying apparatus 50 will be described. The paint spraying apparatus 50 constitutes a part of the coating installation 40. FIG. 5 is a side view showing an example of a usage state of the paint spraying apparatus 50. The stabilizer 10 is carried to the paint spraying apparatus 50 in a state in which the eye portion 22 is suspended by the hook 42 of the hanger 41.

The paint spraying apparatus 50 comprises a supporting structure 51, a lower nozzle unit 60 arranged on the lower part of the supporting structure 51, and an upper nozzle unit 80 provided on the upper part of the supporting structure 51. The lower nozzle unit 60 is arranged at a position corresponding to the lower eye portion 21 of the stabilizer 10 which is hung by the hanger 41. The upper nozzle unit 80 is arranged at a position corresponding to the upper eye portion 22 of the stabilizer 10 which is hung by the hanger 41.

The supporting structure 51 includes a pillar portion 52 installed on a floor, etc., in a factory. A lower arm portion 53 for the lower nozzle unit 60 is provided on the lower part of the pillar portion 52. On the upper part of the pillar portion 52, an upper arm portion 54 for the upper nozzle unit 80 is provided. As shown in FIG. 5, the stabilizer 10 in which the eye portion 22 is supported by the hanger 41 is carried in a position inclined obliquely. Accordingly, a distance from the upper eye portion 22 to the pillar portion 52 becomes greater than a distance from the lower eye portion 21 to the pillar portion 52. Thus, in a case of an embodiment shown in FIG. 5, a horizontal length of the lower arm portion 53 is made shorter than a horizontal length of the upper arm portion 54.

Figure 6:
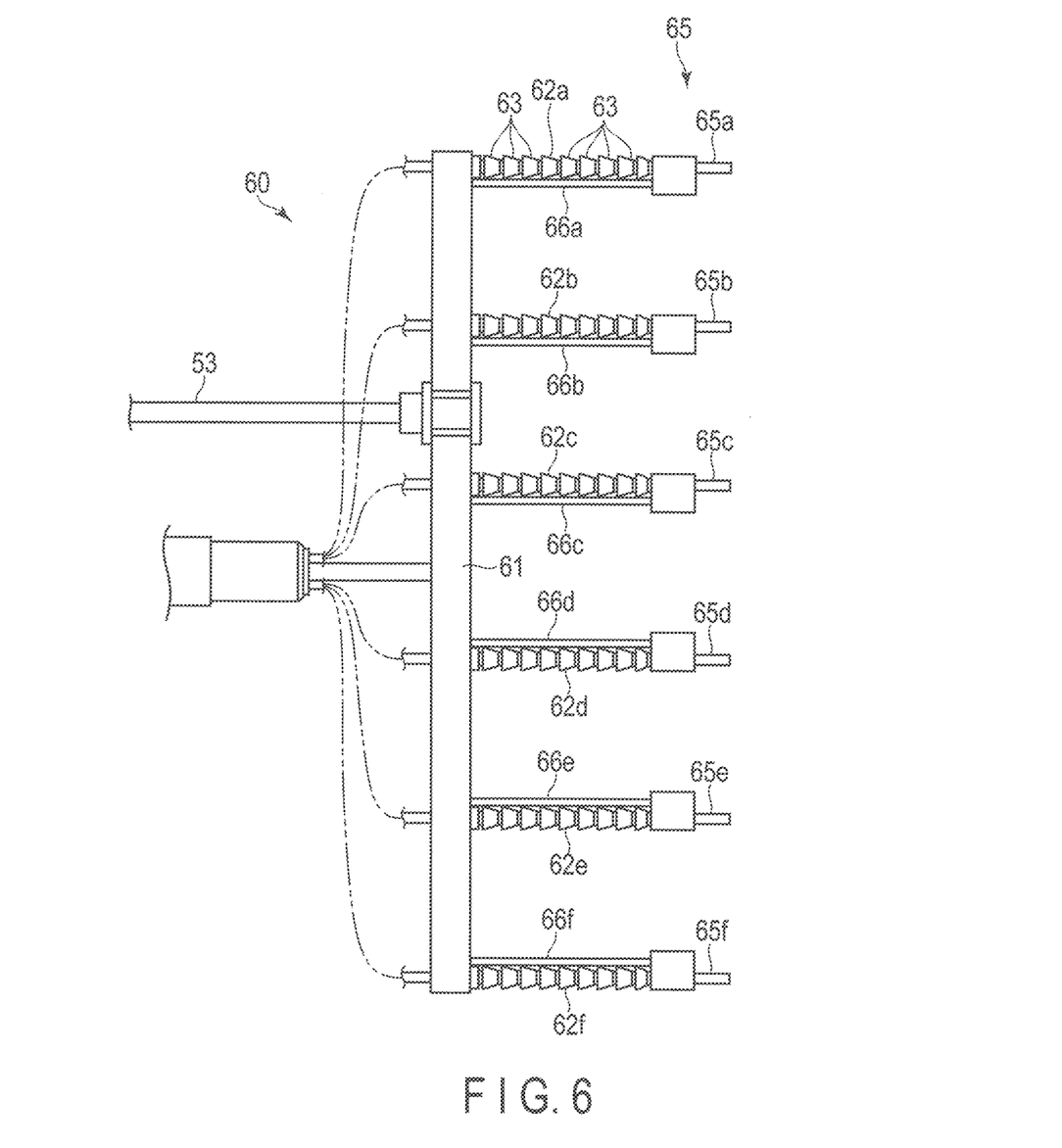
FIG. 6 is a side view of a lower nozzle unit of the paint spraying apparatus shown in FIG. 5.

FIG. 6 is a side view of the lower nozzle unit 60. The lower nozzle unit 60 comprises a lower frame 61, lower flexible tubes (tubes with flexibility) 62a to 62f, lower nozzles 65a to 65f, and lower electrodes 66a to 66f. The lower frame 61 is supported by the lower arm portion 53. The nozzles 65a to 65f are provided at distal ends of the flexible tubes 62a to 62f. The lower frame 61 extends substantially vertically and is substantially shaped in the form of the letter I, but may be inclined obliquely.

In the case of the present embodiment, as an example, six flexible tubes 62a to 62f and nozzles 65a to 65f are arranged in line at a predetermined pitch on the lower frame 61. These nozzles 65a to 65f constitute a lower nozzle group 65. Note that the lower frame 61 is not limited to have the I-shaped form. For example, the frame shape may be in the form of the letter L, letter T, or letter Y, and each of the nozzles may be arranged at a position suitable for spraying the powder paint 46 toward the lower eye portion 21. Further, the number of nozzles may be other than six.

The lower flexible tubes 62a to 62f are connected to a paint feed mechanism 71 through a paint feed pipe 70 (FIG. 5). The powder paint 46, which is sent with air from the paint feed mechanism 71, is supplied to the lower nozzles 65a to 65f through the flexible tubes 62a to 62f.

The electrodes 66a to 66f are provided near the nozzles 65a to 65f. For example, the electrodes 66a to 66f are arranged adjacent to the nozzles 65a to 65f, respectively. The electrodes 66a to 66f are connected to one pole of a high-voltage direct current power supply 75 (FIG. 5). The hanger 41 is electrically grounded (earthed) to the other pole of the direct current power supply 75. The electrodes 66a to 66f provide a charge to the powder paint 46 ejected from the nozzles 65a to 65f so that the powder paint 46 is electrified with ions.

Each of the flexible tubes 62a to 62f is constituted by rotatably connecting a plurality of (for example, about 8 to 10) tube elements 63 including a hollow spherical joint, for example, to each other in series. Accordingly, the flexible tubes 62a to 62f can be formed in a bent shape or a straight shape by hand. The shape of the flexible tubes 62a to 62f is maintained by frictional force between the spherical joints of the tube elements 63. Of the six flexible tubes 62a to 62f, four flexible tubes 62a, 62b, 62e, and 62f, for example, are bent toward the lower eye portion 21. The powder paint 46 ejected from each of the lower nozzles 65a, 65b, 65e, and 65f proceeds toward the lower eye portion 21. The lengths of the lower flexible tubes 62a to 62f are equal to each other.

The powder paint 46 injected toward the lower eye portion 21 adheres to the eye portion 21 by electrostatic force. The orientation of the lower nozzles 65a, 65b, 65e, and 65f, and the injection quantity, etc., are set such that the thickness of the powder paint 46 which adheres to the eye portion 21 becomes less than the thickness of the powder paint of the stabilizer body portion 20.

If a quantity of the powder paint 46 ejected from all of the lower nozzles 65a to 65f toward the eye portion 21 is excessive, a part of the nozzles, which are the nozzles 65c and 65d, are treated as dummy nozzles. The dummy nozzles 65c and 65d are bent in a direction of avoiding the eye portion 21 so that the powder paint 46 is not discharged toward the eye portion 21. Alternatively, a cover, such as a bag, may be put on the dummy nozzles 65c and 65d. If the dummy nozzles 65c and 65d are completely closed, a quantity of the powder paint ejected from the other nozzles 65a, 65b, 65e, and 65f is increased. Thus, caution must be taken for this.

The dummy nozzles 65c and 65d may be directed toward a suction port 101 of a powder recovery apparatus (a dust collector) 100, as shown in FIG. 5. By doing so, the powder paint 46 sprayed out from the dummy nozzles 65c and 65d can be effectively collected. Depending on the shape of the eye portion 21, all of the lower nozzles 65a to 65f may be directed toward the eye portion 21, so that the powder paint is sprayed from all of the nozzles 65a to 65f toward the eye portion 21.

Figure 7:
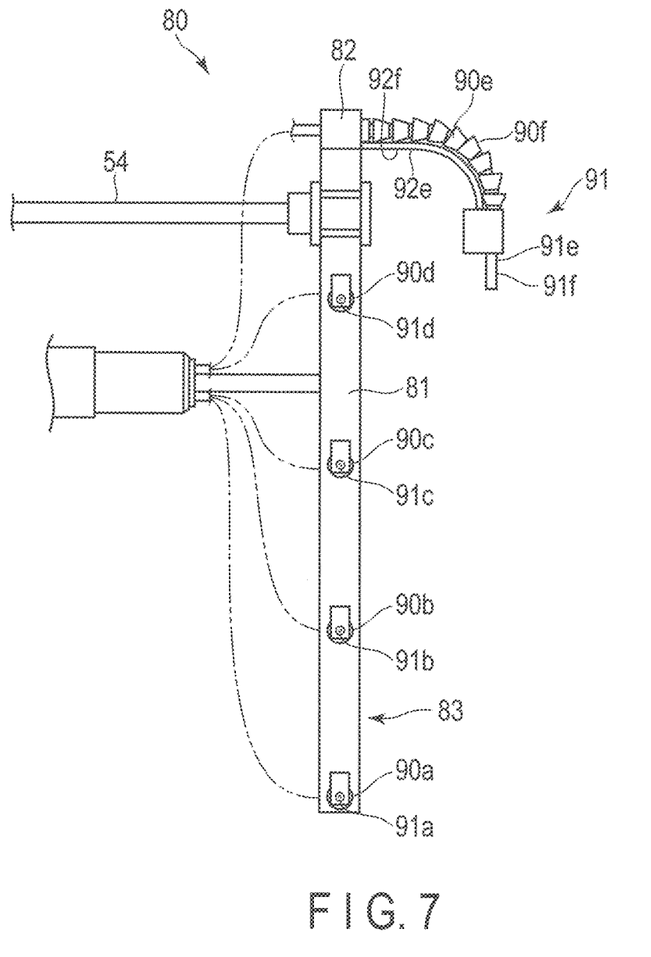
FIG. 7 is a side view of an upper nozzle unit of the paint spraying apparatus shown in FIG. 5.
Figure 8:
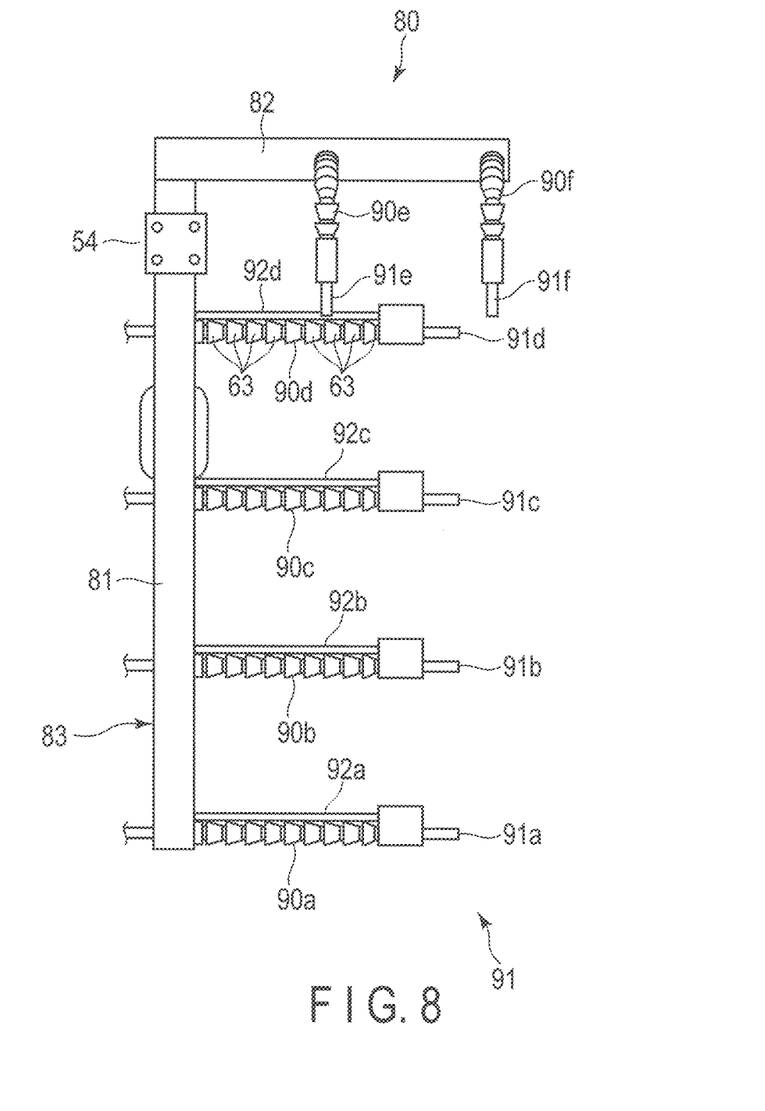
FIG. 8 is a front view of the upper nozzle unit shown in FIG. 7.

FIG. 7 is a side view of the upper nozzle unit 80, and FIG. 8 is a front view of the upper nozzle unit 80. The upper nozzle unit 80 is arranged above the lower nozzle unit 60. The upper nozzle unit 80 comprises a first frame 81, first flexible tubes (tubes with flexibility) 90a to 90d, a second frame 82, second flexible tubes 90e and 90f, first nozzles 91a to 91d, second nozzles 91e and 91f, and electrodes 92a to 92f. The first frame 81 is supported by the upper arm portion 54. The first flexible tubes 90a to 90d are arranged on the first frame 81. The second frame 82 is provided on the first frame 81. The second flexible tubes 90e and 90f are arranged on the second frame 82. The nozzles 91a to 91f are provided on distal ends of the flexible tubes 90a to 90f, respectively. The number of each of the second flexible tubes and the second nozzles to be provided on the second frame 82 may be other than two.

A substantially L-shaped upper frame 83 is constituted by the first frame 81 and the second frame 82. The first frame 81 and the second frame 82 of the present embodiment are formed of frame members different from each other. However, as another form of the upper frame 83, the first frame 81 and the second frame 82 may be formed integrally by bending a single frame member.

The first frame 81 extends in a first direction (for example, in a vertical direction). The second frame 82 extends in a second direction (for example, a movement direction of the hanger 41) perpendicular to the first frame 81. As an example, four flexible tubes 90a to 90d are arranged on the first frame 81 at a predetermined pitch. The nozzles 91a to 91d are provided on the flexible tubes 90a to 90d, respectively. Two flexible tubes 90e and 90f are arranged on the second frame 82. The nozzles 91e and 91f are provided on the flexible tubes 90e and 90f, respectively. An upper nozzle group 91 is constituted by these nozzles 91a to 91f.

Note that the shape of the upper frame 83 is not limited to an L-shape, and a T- Y-, or I-shaped frame configuration, for example, may be adopted. In the upper frame 83, the respective nozzles are arranged at positions suitable for spraying the powder paint 46 toward the upper eye portion 22. The number of nozzles to be arranged at the upper frame 83 may be other than six.

The flexible tubes 90a to 90f are connected to the paint feed mechanism 71 through the paint feed pipe 70 (FIG. 5). The powder paint 46, which is sent with air from the paint feed mechanism 71, is supplied to the nozzles 91a to 91f through the flexible tubes 90a to 90f.

The electrodes 92a to 92f are provided near the nozzles 91a to 91f. For example, the electrodes 92a to 92f are arranged adjacent to the nozzles 91a to 91f, respectively. The electrodes 92a to 92f are connected to one pole of the direct current power supply 75 (FIG. 5). The electrodes 92a to 92f provide a charge to the powder paint 46 ejected from the nozzles 91a to 91f so that the powder paint 46 is electrified with ions.

The upper flexible tubes 90a to 90f are constituted by rotatably connecting a plural of (for example, about 8 to 10) tube elements 63 including a hollow spherical joint to each other in series, likewise the lower flexible tubes 62a to 62f. Accordingly, the flexible tubes 90a to 90f can be formed in a bent shape or a straight shape by hand. The shape of the flexible tubes 90a to 90f is maintained by frictional force between the spherical joints of the tube elements 63.

Four flexible tubes 90a to 90d are arranged on the first frame 81. Two flexible tubes 90e and 90f are arranged on the second frame 82. Each of the flexible tubes 90a to 90f is bent in a direction corresponding to the upper eye portion 22. The nozzles 91a to 91f are provided on distal ends of the flexible tubes 90a to 90f, respectively. The powder paint 46 ejected from each of the nozzles 91a to 91f proceeds toward the upper eye portion 22.

The powder paint 46 injected toward the upper eye portion 22 adheres to the eye portion 22 by electrostatic force. The orientation of each of the nozzles 91a to 91f of the upper nozzle unit 80 and the injection quantity, etc., are set such that the thickness (second thickness) of the powder paint 46 which adheres to the eye portion 22 becomes less than the thickness (first thickness) of the powder paint of the stabilizer body portion 20.

The paint spraying apparatus 50 comprises the powder recovery apparatus 100 (schematically shown in FIG. 5). The powder paint 46 which did not adhere to the stabilizer 10 of the powder paint 46 ejected from the nozzle groups 65 and 91 is collected by the powder recovery apparatus 100. The recovered powder paint 46 is reused (recycled).

The lower eye portion 21 of the stabilizer 10 suspended from the hanger 41 does not contact the hanger 41. Accordingly, the powder paint 46 can be made to adhere to the lower eye portion 21 by using relatively few (for example, four) nozzles 65a, 65b, 65e, and 65f arranged at the lower frame 61. In contrast, a part of the upper eye portion 22 is in contact with the hanger 41. Moreover, part of the powder paint 46 injected from the upper nozzles 91a to 91f toward the eye portion 22 tends to be attracted to the hanger 41 by electrostatic force. Accordingly, as compared to the lower eye portion 21, the powder paint 46 is hard to be applied to the upper eye portion 22.

The upper nozzle unit 80 of the present embodiment includes the first frame 81 extending in the first direction (vertical direction), and the second frame 82 extending in the second direction (the movement direction of the hanger 41). The nozzles 91a to 91d are arranged at the first frame 81, and the nozzles 91e and 91f are arranged at the second frame 82. Further, the upper nozzle unit 80 sprays the powder paint 46 from the six nozzles 91a to 91f toward the eye portion 22. In contrast, the lower nozzle unit 60 sprays the powder paint 46 from the nozzles 65a, 65b, 65e, and 65f fewer than the nozzles of the upper nozzle unit 80 (for example, four in this case) toward the eye portion 21. As described above, the upper nozzle unit 80 sprays the powder paint 46 toward the eye portion 22 by the nozzles 91a to 91f, the number of which is greater than that of the nozzles of the lower nozzle unit 60. Accordingly, the upper nozzle unit 80 can effectively spray the powder paint 46 aiming at the optimum position of the upper eye portion 22. As a result, the thickness of the coating film being varied in the lower eye portion 21 and the upper eye portion 22 can be avoided, and the coating film of good quality can be formed.

The stabilizer 10 is carried while being suspended by the hanger 41. Therefore, the lower part of the stabilizer 10, in particular, sways easily. Thus, the position of the lower eye portion 21 becomes more unstable than the upper eye portion 22. In consideration of the above, in the nozzle group 65 of the lower nozzle unit 60, the position and orientation of the nozzles 65a to 65f are optimized such that the powder paint 46 can be injected in a range wider than a spray range of the nozzle group 91 of the upper nozzle unit 80. By doing so, the powder paint 46 can also be sufficiently sprayed on the lower eye portion 21 which sways easily. Since the upper eye portion 22 does not sway much, the nozzle group 91 of the upper nozzle unit 80 accurately sprays the powder paint 46 in a relatively narrow range aiming at the eye portion 22.

The upper nozzles 91a to 91f need to be arranged such that the powder paint 46 is injected toward the optimum position of the upper eye portion 22. The upper nozzle unit 80 includes the first frame 81 extending in the first direction, and the second frame 82 extending in the second direction perpendicular to the first frame 81. A plurality of nozzles 91a to 91f are arranged separately in the first frame 81 and the second frame 82. For this reason, even if the nozzles 91a to 91f are to be arranged to inject the powder paint 46 toward the optimum position of the eye portion 22, the lengths of the respective flexible tubes 90a to 90f can be made equal to each other. Moreover, the lengths of the respective flexible tubes 90a to 90f can be shortened as much as possible.

With respect to the flexible tube comprising a plurality of tube elements 63, frictional force between the tube elements 63 may be reduced by wear of the spherical joint or degradation over time, for example. When a long flexible tube is used, a distal end side of the long flexible tube may sag under the weight of the nozzle arranged on the distal end. In contrast, for the nozzle unit 80 of the present embodiment, relatively short flexible tubes 90a to 90f having a common length can be used, instead of using long flexible tubes. In other words, since use of the long flexible tube can be avoided, a problem that the distal end side of the flexible tube sags under its own weight can be avoided.

In carrying out the present invention, the specific shapes of not only the hanger and the electrostatic gun, which are the constituent elements of the coating installation, but also the supporting structure, the lower nozzle unit, and the upper nozzle unit of the paint spraying apparatus, which constitutes a part of the coating installation, may be different from those described in the above embodiment. For example, the lower frame of the lower nozzle unit may be structured as a modified frame in the shape of letter L formed by the first frame and the second frame of the upper nozzle unit. Further, the lower nozzles may be arranged at the most suitable positions of this modified frame. Needless to say, the number and arrangement or the like of the flexible tubes and the nozzles can be modified variously, if needed, when implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A paint spraying apparatus for a stabilizer comprising:
    a supporting structure;
    a lower nozzle unit provided on the supporting structure and configured to spray powder paint toward a lower eye portion of the stabilizer; and
    an upper nozzle unit provided on the supporting structure and configured to spray the powder paint toward an upper eye portion of the stabilizer,
    wherein the lower nozzle unit comprises:
    a lower frame;
    a plurality of lower flexible tubes arranged on the lower frame;
    lower nozzles provided at respective distal ends of the lower flexible tubes, and configured to eject the powder paint; and
    lower electrodes which provide a charge to the powder paint ejected from the lower nozzles,
    wherein the upper nozzle unit comprises:
    a first frame extending in a first direction;
    a plurality of first flexible tubes arranged on the first frame;
    first nozzles provided at respective distal ends of the first flexible tubes, and configured to eject the powder paint;
    a second frame extending in a second direction different from the first direction;
    second flexible tubes arranged on the second frame;
    second nozzles provided at distal ends of the second flexible tubes, and configured to eject the powder paint;
    upper electrodes which provide a charge to the powder paint ejected from the first nozzles and the second nozzles; and
    a paint feed mechanism which supplies the powder paint to the lower flexible tubes, the first flexible tubes, and the second flexible tubes, and
    wherein at least one of the lower nozzles is a dummy nozzle which ejects the powder paint in a direction that avoids the lower eye portion, wherein the dummy nozzle is directed toward a powder recovery apparatus.

2. The paint spraying apparatus of claim 1, wherein each of the lower flexible tubes is constituted by connecting a plurality of tube elements to each other in series, the tube elements having shapes in common with each other with a hollow spherical joint, and lengths of the lower flexible tubes are equal to each other.

3. The paint spraying apparatus of claim 1, wherein each of the first flexible tubes and the second flexible tubes is constituted by connecting a plurality of tube elements to each other in series, the tube elements having shapes in common with each other with a hollow spherical joint, and lengths of the first flexible tubes and the second flexible tubes are equal to each other.

4. The paint spraying apparatus of claim 2, wherein each of the first flexible tubes and the second flexible tubes is constituted by connecting a plurality of tube elements to each other in series, the tube elements having shapes in common with each other with a hollow spherical joint, and lengths of the first flexible tubes and the second flexible tubes are equal to each other.

5. A coating installation comprising:
a hanger including a hook which is inserted into a through-hole of one eye portion of eye portions provided on both ends of a stabilizer;
an electrostatic gun which sprays charged powder paint on a whole of the stabilizer suspended by the hanger, thereby making the powder paint adhere to the whole of the stabilizer at a first thickness;
an air injection gun which exfoliates the powder paint adhering to the respective eye portions of the stabilizer by an air blow;
a paint spraying apparatus which sprays the powder paint on the respective eye portions, thereby making the powder paint adhere to the eye portions at a second thickness less than the first thickness; and
a heating furnace which bakes the powder paint adhering to the stabilizer,
wherein the paint spraying apparatus comprises:
a supporting structure;
a lower nozzle unit provided on the supporting structure and configured to spray the powder paint toward the eye portion on a lower side of the stabilizer; and
an upper nozzle unit provided on the supporting structure and configured to spray the powder paint toward the eye portion on an upper side of the stabilizer,
the lower nozzle unit comprises:
a lower frame;
a plurality of lower flexible tubes arranged on the lower frame;
lower nozzles provided at respective distal ends of the lower flexible tubes, and configured to eject the powder paint; and
lower electrodes which provide a charge to the powder paint ejected from the lower nozzles, and
the upper nozzle unit comprises:
a first frame extending in a first direction;
a plurality of first flexible tubes arranged on the first frame;
first nozzles provided at respective distal ends of the first flexible tubes, and configured to eject the powder paint;
a second frame extending in a second direction different from the direction of the first frame;
second flexible tubes arranged on the second frame;
second nozzles provided at distal ends of the second flexible tubes, and configured to eject the powder paint;
upper electrodes which provide a charge to the powder paint ejected from the first nozzles and the second nozzles; and
a paint feed mechanism which supplies the powder paint to the lower flexible tubes, the first flexible tubes, and the second flexible tubes.

6. A coating method comprising:
carrying a stabilizer in a suspended state by hanging one eye portion of eye portions on both ends of the stabilizer on a hook of a hanger;
spraying charged powder paint on a whole of the stabilizer suspended by the hanger, thereby making the powder paint adhere to the whole of the stabilizer at a first thickness;
exfoliating the powder paint adhering to the eye portions by an air blow;
spraying the powder paint toward the eye portion on a lower side by lower nozzles arranged at positions corresponding to the lower eye portion of the stabilizer, thereby making the powder paint adhere to the lower eye portion at a second thickness less than the first thickness;
spraying the powder paint toward the eye portion on an upper side by upper nozzles arranged at positions corresponding to the upper eye portion of the stabilizer, thereby making the powder paint adhere to the upper eye portion at the second thickness; and
heating the powder paint adhering to the stabilizer and baking the powder paint on a surface of the stabilizer.

* * * * *